United States Patent [19]
Reuter et al.

[11] Patent Number: 4,997,155
[45] Date of Patent: Mar. 5, 1991

[54] SUSPENSION APPARATUS FOR CONTROL DEVICES

[75] Inventors: Wolfgang Reuter, Burbach-Wurgendorf; Jurgen Debus, Dietzholztal; Lothar Lehr, Burbach-Oberdresselndorf, all of Fed. Rep. of Germany

[73] Assignee: Rittal-Werk Rudolf Loh GmbH & Co. KG, Fed. Rep. of Germany

[21] Appl. No.: 313,590

[22] Filed: Feb. 21, 1989

[30] Foreign Application Priority Data

Feb. 22, 1988 [DE] Fed. Rep. of Germany ....... 3805422

[51] Int. Cl.⁵ .......................................... F16M 13/00
[52] U.S. Cl. .................................... 248/278; 403/295
[58] Field of Search ...................... 248/122, 278, 674; 403/295, 401, 402; 52/656; 312/223; 174/72 C

[56] References Cited

U.S. PATENT DOCUMENTS

| 3,304,108 | 2/1967 | Hamilton | 403/295 |
| 4,527,364 | 7/1985 | Baus | 403/295 |
| 4,683,634 | 8/1987 | Cole | 403/295 |
| 4,691,486 | 9/1987 | Niekrasz | 403/295 |

FOREIGN PATENT DOCUMENTS

| 0058540 | 8/1982 | European Pat. Off. . | |
| 2462052 | 10/1975 | Fed. Rep. of Germany | 403/401 |
| 3034013 | 9/1980 | Fed. Rep. of Germany . | |
| 972215 | 8/1950 | France | 403/401 |
| 1342938 | 10/1963 | France . | |

Primary Examiner—Ramon O. Ramirez
Assistant Examiner—Robert A. Olson
Attorney, Agent, or Firm—Thomas W. Speckman; Douglas H. Pauley

[57] ABSTRACT

This invention relates to a suspension apparatus for control devices which can be assembled from a connection flange or connection rotary joint, support beam sections, angle units, or intermediate joints, which can be connected with a wall or a machine body and a coupling unit which can be connected with the control device. The support beam sections have an essentially U-shaped base profile section and a closing cover profile secton. The base profile section, with a separating bar positioned parallel to its bar, is divided into a support part constructed as a closed hollow profile and an open U-shaped mounting part turned away from the bar. In the support part and in the mounting part, longitudinally directed and penetrating connecting bars are integrally formed with screw mountings. The angle comprising a corner connector and a covering cap creates, for such suspension apparatus, a rigid, highly-stressable corner connector between support beam sections placed perpendicular to one another. When the covering cap is removed, the connection lines are easily conducted, and can then be covered by means of the covering cap.

11 Claims, 3 Drawing Sheets

SUSPENSION APPARATUS FOR CONTROL DEVICES

BACKGROUND OF THE INVENTION

This invention relates to a suspension apparatus for control devices which can be assembled from a connection flange or connection rotary joint, support beam sections, angle units, or intermediate joints connected to a wall or a machine body and a coupling unit which can be connected with the control device. Support beam sections consist of an essentially U-shaped base-profile section and a cover profile section closing the same. The base profile section, with a separating bar proceeding parallel to its bar, is divided into a support part constructed as a closed hollow profile and an open U-shaped mounting part turned away from the bar. In the support part and in the mounting part longitudinally-directed and penetrating connecting bars are integrally formed with screw mountings.

With the connecting rotary joint, the intermediate joint and the coupling unit, there is a universal rotating capacity of the control device attached to the end of the suspension apparatus. With the angle units, a transition from a horizontal to a vertical support beam section, or vice versa, is achieved. The support beam sections are components which are cut into various lengths of profile sections.

In one known suspension apparatus, the support beam section has an essentially U-shaped base profile section and a cover profile section. With a separating bar parallel to the bar, the base profile section is divided into a support part, constructed as a closed hollow profile, and a U-shaped open mounting part turned away from the bar. Furthermore, both in the support part, as well as in the mounting part, longitudinally-directed and penetrating connection bars are integrally formed with screw reception mounts. Thus other parts of the suspension apparatus can easily be rotated with the frontal sides of the base profile section. The cover profile section makes the mounting part of the base profile section accessible and completes the support beam section. The support part which is constructed as a closed hollow profile gives the support beam section excellent stability. Connecting lines from the control device to the machine can easily be inserted into the open mounting part, which can be closed with the cover profile section. The control device can also be constructed as a control panel or the like.

SUMMARY OF THE INVENTION

It is an object of this invention to provide, for a suspension apparatus of the type stated above, an angle unit which is simply constructed. Support beam sections placed perpendicular to one another can be rigidly connected with one another so that the corner connection can absorb great stresses, without complicated insertion of connection lines in the area of the corner. The inserted connection lines should also be equally protected in the area of the corner connection as in the area of the mounting parts of the adjoining support beam sections.

According to one embodiment of this invention, the angle units each comprise a corner connector and a covering cap. The corner connector has two mounting plates with mounting limbs positioned at right angles to one another. The mounting limbs are reinforced against one another on the side of the right angle with an inclined connection bridge The mounting limbs are connected with screws and the screw reception mounts of the connection bars of two base profile sections are positioned perpendicular to one another. The reception mounting parts of such sections are positioned on the obtuse side of the corner connection. Two guide plates positioned perpendicular to one another and positioned parallel to the mounting plates, which can be inserted into the support parts and abut on internal sides of the bar of the base profile sections, are integrally formed in the corner area of the obtuse angle of the mounting plates. The mounting plates are recessed at least in the area of the mounting part between the mounting limbs. The cover cap, on the obtuse side of the corner connection, partially covers both support beam sections positioned perpendicular to one another, laterally in the area of the cover profile section. The cover cap is connected with a connection strip positioned in the area of the right angle and is held on the corner connector and both support beam sections.

The corner connector provides a stable, rigid connection between the base profile sections, positioned at right angles to one another, of both support beam sections of the corner connection. Thus, the guide plates provide additional support and reinforcement to the corner connection. When the cover cap is removed, the recesses in the mounting plates provide easy installation of the connection lines. From the mounting part of one support section which is placed on the connection bridge of the corner connector, the connection lines can be inserted directly into the mounting part of the other support beam section. After closing the mounting parts with the cover profile sections, the cover cap is attached. The connection lines are also protected with a cover in the area of the corner connection. Thus, the cover cap additionally secures the cover profile sections to the base profile sections of the support beam sections. In the corner area, the connection bridge provides support for and secures the connection lines.

In accordance with one embodiment, the connection bridge, i the central area, only extends over a portion of the width of the mounting plates. The mounting plates are recessed in the central areas covered by the connection bridge such that laterally from the connection bridge only the mounting limbs are connected with mounting borings for screws with the connection bridge. Connection lines which are threaded into the support parts of the support beam sections can also be led through the corner connection.

With the connection bridge of the corner connector, sufficient space is present for the connection lines. In one embodiment, in the area of the mounting plates, the connection bridge aligns with the front sides of the separating bars of the base profile sections positioned perpendicular to one another and connected with the corner connection. Thus, the cross section of the mounting parts can be used almost entirely for accommodating connection lines.

The support of the corner connection in the adjoining base profile sections of the support beam sections is improved by having the guide plates provided with lateral borderings which are placed against the internal walls of the lateral limb sections of the support parts.

In accordance with one embodiment, the cover cap is fixed to the corner section in such a manner that the connection strip on the side of the corner connection is, with the right angle and by positioning sealing strips with bearing surfaces, placed against the external walls of the bars of the support parts of the base profile sections, with one flattened edge on an inclined edge of the corner connection. The cover cap has borings in the side walls and the front side of the connection strip has screw reception mountings. The side walls of the cover cap are screwed to the front sides of the connection strip with screws.

An excellent screw connection between the corner connector and the base profile sections of the support beam sections results from having the connection bars positioned in pairs and directed to one another on the internal walls of the lateral limb sections. The lateral limb sections are placed opposite one another and have the support part and mounting part of the base profile sections at approximately the same distance from the separating bar. The borings in the mounting limbs of the mounting plates of the corner connection are adjusted to such arrangement and distribution of the connection bars.

The corner connection is preferably a cast metal part or metallic injection molded part.

BRIEF DESCRIPTION OF THE DRAWINGS

This invention is illustrated in further detail with one embodiment shown in the drawings wherein.

DESCRIPTION OF PREFERRED EMBODIMENTS

Figure 1:
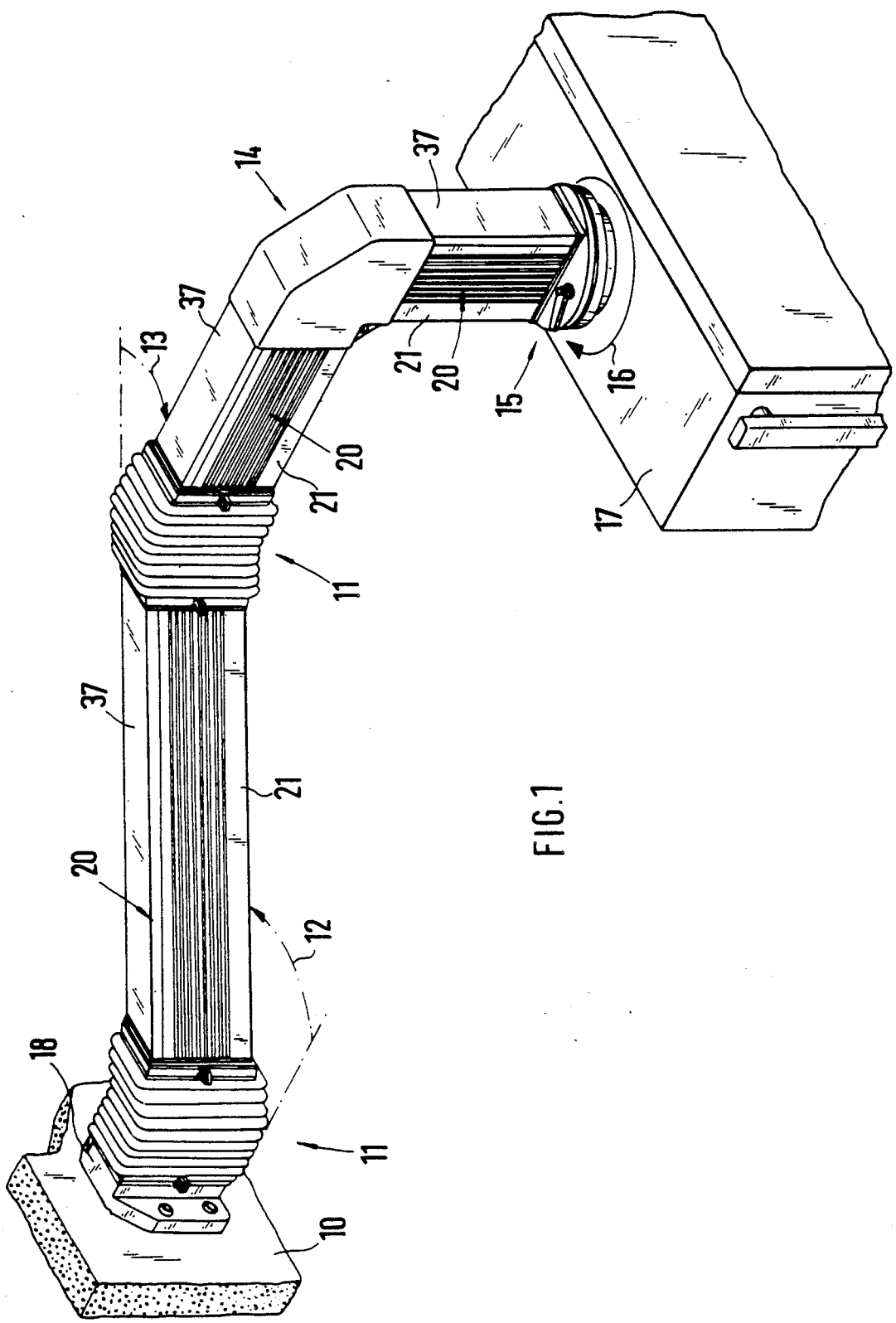
FIG. 1 shows a perspective view of a complete suspension apparatus.

A wall or a machine body to which the suspension apparatus, constructed as a support beam, is attached is designated in FIG. 1 by reference number (10). The connection flange (18) is connected with the part (10) which is connected to an intermediary joint (11), covered with a bellows unit. The connection flange (18) and the intermediary joint (11) can also be constructed as a connection joint, representing a single unit. A first horizontally oriented support beam section (20) which comprises a base profile section (21) and a cover profile section (37) is connected to intermediary joint (11). The support beam section (20) can be rotated on the connection rotary joint, as the pivot angle (12) indicates. An additional horizontal support beam (20), which is finally connected with the vertical support beam section (20) with the angle unit (14), connects to the first support beam section (20) with the intermediary joint (11) which is covered by the bellows unit. The pivot angle (13) shows that both horizontal support beam sections (20) can be pivoted relative to one another. The lower end of the vertical support beam section (20) is connected with the coupling unit (15) which supports the control device (17). By means of the coupling unit (15), the control device (17) can be rotated with respect to the vertical support beam section (20), as the pivoting circle (16) shows. The suspension apparatus in accordance with FIG. 1 represents only one embodiment. The support beam sections (20) can have various lengths. The individual parts can also be assembled in another sequence into another suspension apparatus.

Figure 2:
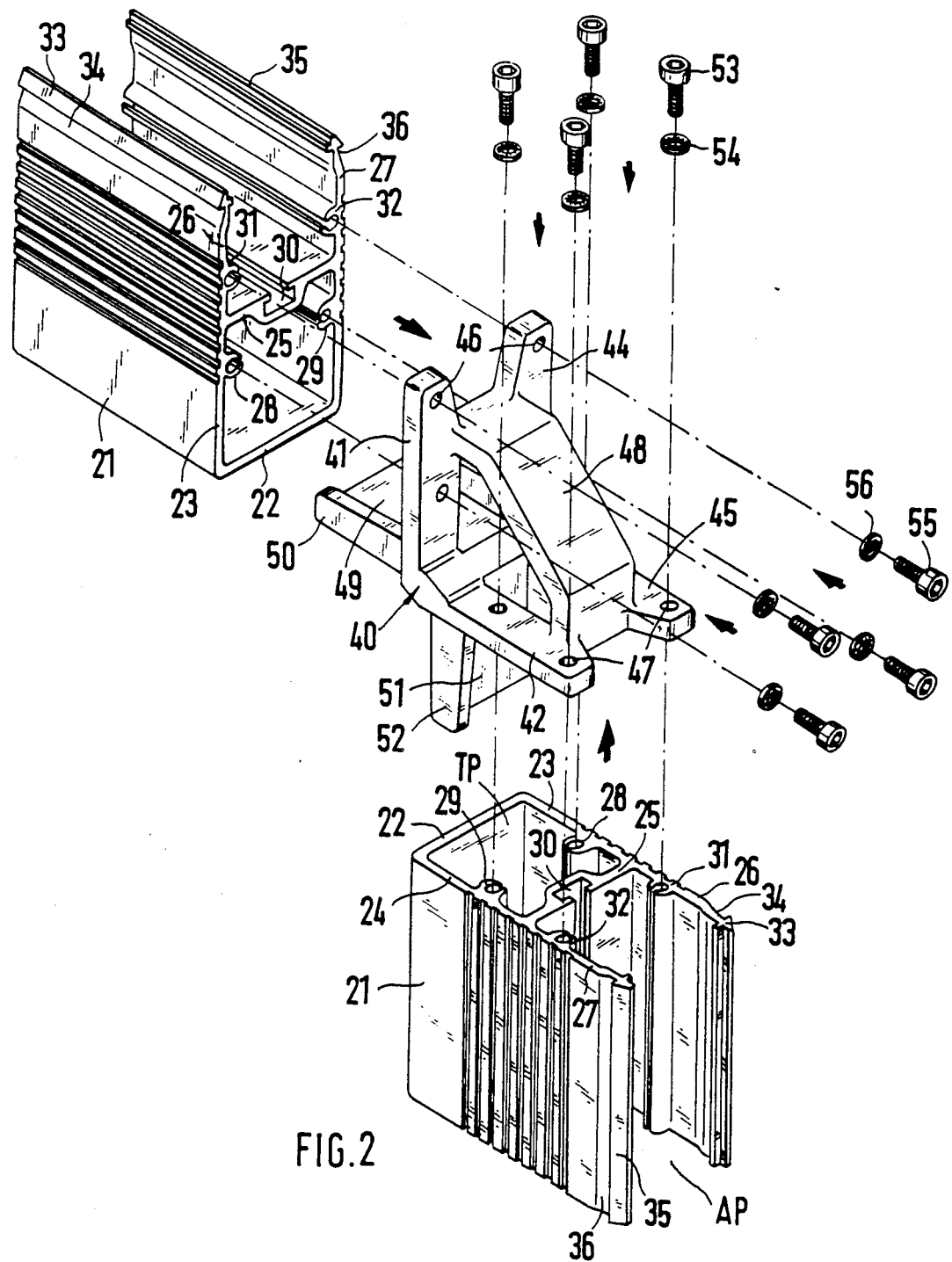
FIG. 2 shows an exploded view of a corner connection of the angle unit with two base profile sections of the support beam sections positioned perpendicular to one another.

In order to make the support beam sections (20) available in different lengths, the base profile section (21) is divided into lengths by a corresponding profile section of necessary length. The base profile section (21) is essentially U-shaped whereby the lateral limb sections (23 and 26 or 24 and 27) connect with the bar (22), as shown in FIG. 2. The separating bar (25) which is parallel to the bar (22) divides the base profile section (21) into the support part (TP) and the reception mounting part (AP). The support part (TP) is a closed hollow profile of the bar (22), the lateral limb sections (23 and 24) and the separating bar (25). The mounting part (AP) is formed by the separating bar (25) and the lateral limb sections (26 and 27), it is open on the side of the base profile section (21) which is turned away from the bar (22), and it serves as a mounting reception for the connection lines. The support part (TP) gives the base profile section (21) excellent stability and the open mounting part (AP) facilitates the insertion of the connection lines. The lateral limb sections (26 and 27) proceed into the connection ends (33 and 35) which are provided with the rear cuts (34 and 36). The mounting part (AP) is closed with the U-shaped cover profile section (37). The lateral limbs (38 and 38') have a suspension attachment (39) or a locking attachment (39'). If the suspension attachment (39) of the lateral limb (38) is suspended in the rear section (34) of the connection end (33) of the lateral limb section (26), then upon engaging the cover profile section (37), the locking attachment (39') of the lateral limb (38') engages with the rear cut section (36) in the connection end (35) of the lateral limb section (27). The cover profile section (37), by removing such locking connection, can be easily loosened from the mounting part (AP) of the base profile section (21).

The connection ends (33 and 35) are inwardly displaced far enough relative to the lateral limb sections (26 and 27) so that the cover profile section (37) with the external walls of its lateral limbs (38 and 38') snugly closes with the external walls of the lateral limb sections (26 and 27). The rear cut sections (34 and 36) are longitudinally directed and penetrating. The cover profile section (37) likewise has a longitudinally directed and penetrating suspension attachment (39) and a locking attachment (39').

Longitudinally directed and penetrating connection bars (28, 29, 31 and 32) having screw reception mounts are integrally formed with the internal walls of the lateral limb sections (23, 24, 26, and 27). The screw reception mounts are opened with penetrating slot apertures so that they can easily be removed. The width of the slot apertures is such that the screw reception mount extends over more than 180 degrees of its circumference, preferably over approximately 270 degrees. The slot apertures facilitate the production of the base profile section (21) during an extrusion press process. The pairs of connection bars (28 and 29, and 31 and 32) in the support part (TP) or mounting part (AP) are, on the internal walls of the lateral limb sections (23 and 24, and 26 and 27) which face opposite one another, positioned toward one another in pairs. The central longitudinal axes of the screw reception mounts have approximately the same distance to the separating bar (25). With the screw reception mounts, a further portion of the suspension apparatus can easily be screwed onto the front sides of the base profile section (21).

In the corner connection of two support arm sections (20), the base profile sections (21) are positioned such that the reception mounting parts (AP) lie on the obtuse side of the corner, as FIG. 2 shows. The bolting is accomplished with the corner connector (40) which has two mounting plates positioned at right angles to one another. These mounting plates are relatively narrow mounting limbs (41 and 42, and 44 and 45) since the mounting plates are recessed under the connection bridge (48). The mounting limbs (41, 42, 44 and 45) have borings (46 and 47) which are adjusted to the arrangement and distribution of the screw reception mountings of the connection bars (28, 29, 31 and 32) of the base profile sections (21). The mounting limbs (41, 42, 44 and 45) are recessed in the part projecting outward over the connection bridge (48) so that after screwing with the base profile sections (21), the connection lines can be led from the mounting part (AP) of the one base profile section (21) onto the connection bridge (48), and can be placed directly into the reception mounting part of the other base profile section (21). The connection bridge (48) aligns in the corner connection with the separating bars (25) of the adjoining base profile sections (21).

On the oblique side of the mounting plates positioned rectilinearly to one another, the guide plates (49 and 51) positioned perpendicular to one another and parallel to the mounting plates are integrally formed with the corner connector (40). The sides of such guide plates (49 and 51) have borderings (50 and 52). The guide plates (49 and 51) are inserted into the support parts (TP) of the base profile sections (21), whereby they abut on the internal walls of the bars (22). The borderings (50 and 52) are placed on the internal walls of the lateral limb sections (23 and 24). With the screws (53 and 55), and through interposition of the washer disks (54 and 56), the corner connector (40) is screwed, through the borings (46 and 47) to the screw reception mountings of the connection bars (28, 29, 31 and 32). The connection bridge (48) reinforces the corner connector (40), but through the recesses in the mounting plates permits a threading of connection lines out of the support parts (TP) of the support beam sections (20). The corner connector (40) is preferably produced as a metallic cast metal part or a metallic injection molded part. Both of the base profile sections (21) are rigidly connected with one another so that the corner connection can absorb high stresses.

Figure 3:
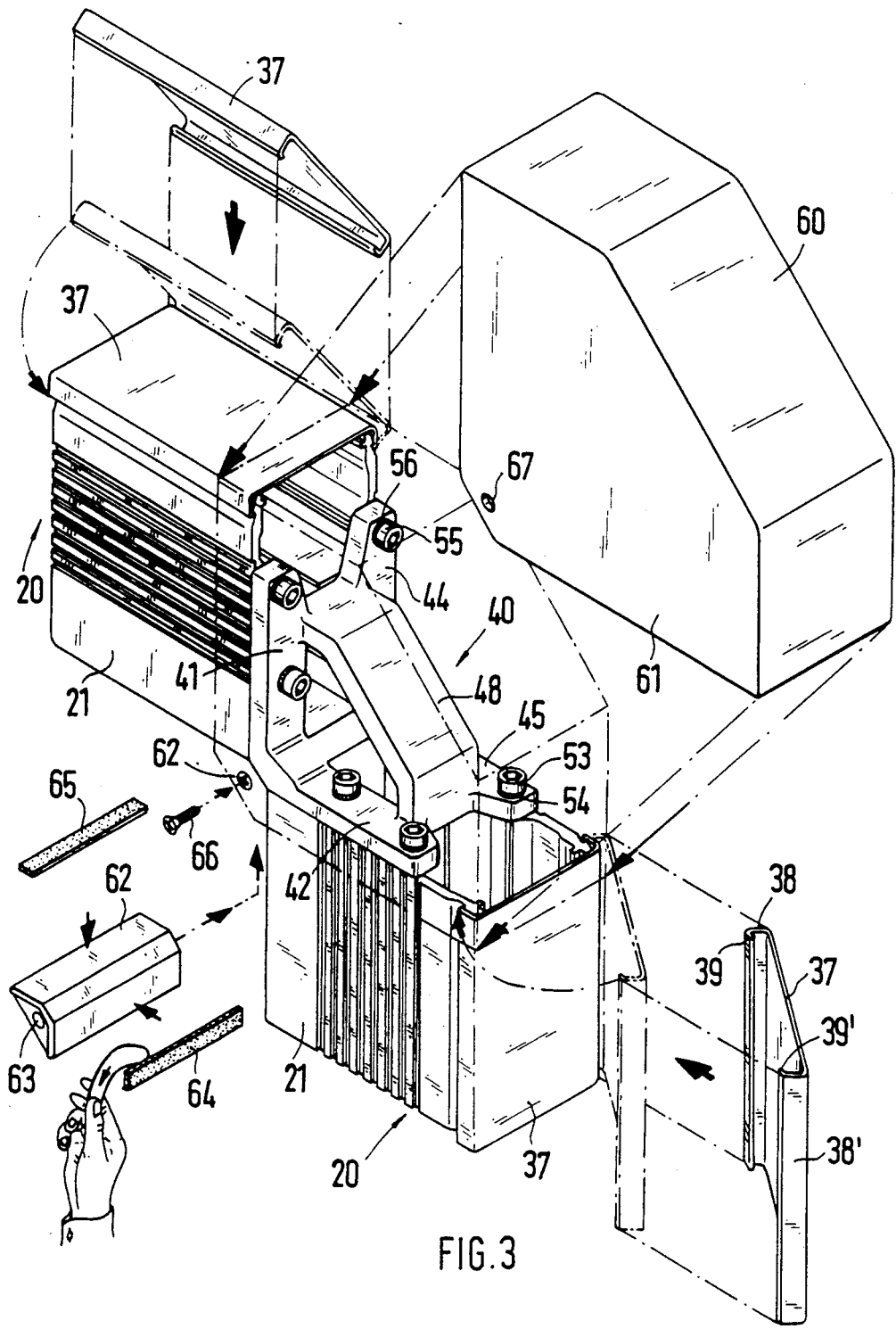
FIG. 3 shows a perspective view of the corner connection produced with the cover profile sections of the support beam sections and the cover cap with the connection strip.

If the base profile sections (21) are connected with one another with the corner connector (40), then after insertion of the connection lines the corner connection is closed with the cover cap (60), as FIG. 3 shows. First, the mounting parts (AP) of the base profile sections (21) are closed with the U-shaped cover profile sections (37). The lateral limbs (38 and 38') of the cover profile sections (37) have the suspension attachment (39) and the locking attachment (39'). First, the suspension attachment (39) is suspended in the rear cut section (34 or 36) of the connection end (33 or 35), then the cover profile section (37) is engaged whereby the locking attachment (39') engages in the rear cut section (36 or 34). If the base profile sections (21) are covered with the cover profile sections (37), then from the obtuse side of the corner and out, the covering cap (60) is moved up onto the corner connection. The lateral walls (61) of the covering cap (60) have borings (67) for mounting screws (66) which are screwed into the screw reception mountings (63) of the front sides of the connection strip (62). The connection strip (62) abuts on the external walls of the bars (22) of the base profile sections (21). The bearing surfaces are first lined with sealing strips (64 and 65) which have an adhesive layer that is exposed after removing a covering foil. The connection strip (62) additionally abuts on the inclined edge of the corner connector (40). The covering cap (60) covers the cover profile sections (37), and the external walls of the lateral limb sections (23, 24, 26 and 27) are somewhat similar so that the cover profile sections (37) are also held to the base profile sections (21). If the covering cap (60) is connected with the connection strip (62), then the covering cap (60) is also held to the corner connection. The connection lines conducted over the connection bridge (48) have sufficient space in the covering cap (60) and are covered in a protected manner. The separating bar (25) has, oriented toward the mounting reception part (AP), the T-groove (30) which can accommodate the mounting elements for fixing the connection lines.

We claim:

1. In a suspension apparatus for control devices which can be assembled from a connection flange and a connection rotary joint, support beam sections, angle units, and intermediate joints which can be connected with a wall and a machine body, and a coupling unit which can be connected with the control device, in which the support beam sections have an essentially U-shaped base profile section and a cover profile section closing the same, whereby the base profile section with a separating bar parallel to a bar of the base profile section is divided into a support part constructed as a closed hollow profile and an open U-shaped mounting part turned away from the bar, and in the support part and in the mounting part longitudinally directed and penetrating connecting bars are integrally formed with screw mountings, the improvement comprising:

said angle units (14) having a corner connector (40) and a covering cap (60); said corner connector (40) having two mounting plates with mounting limbs (41, 42; 44, 45) positioned at right angles to one another, said mounting plates on a side of each said right angle reinforced against one another with an inclined connecting bridge unit (48);

said mounting limbs (41, 42; 44, 45) connected with screws (53, 55) with screw mounts of connecting bars (28, 29; 31, 32) of two said base profile sections (21) positioned perpendicular to one another, said base profile sections positioned such that said mounting parts (AP) lie on an obtuse side of said corner connector (40);

two guide plates (49, 51) positioned perpendicular to one another and parallel to said mounting plates integrally formed with a corner area of an obtuse angle of said mounting plates, said guide plates insertable into said support parts (TP) and abutting on internal walls of said bar (22) of said base profile sections (21);

said mounting plates recessed at least in an area of said mounting part (AP) between said mounting limbs (41, 42; 44, 45); and, said covering cap (60) on said obtuse side of said corner connector partially covering both said support beam sections (20) positioned perpendicular to one another laterally and in an area of a cover profile section (37) and connected with a connecting strip (62) positioned in an area of said right angle and connected with said corner connector (40) and both said support beam sections (20).

2. In a suspension apparatus according to claim 1, wherein:

said connecting bridge unit (48) in a central area only extends over a portion of a width of said mounting plates; and said mounting plates are so recessed in said central ares covered by said connecting bridge (48) that, laterally from said connecting bridge (48), only said mounting limbs (41, 42; 44, 45) with mounting borings (46, 47) for screws (53, 55) are connected to said connecting bridge unit (48).

3. In a suspension apparatus according to claim 2, wherein:

said connecting bridge unit (48), in an area of said mounting plates aligns with front sides of said separating bars (25) of said base profile sections (21) which are positioned perpendicular to one another, is connected with said corner connector (40).

4. In a suspension apparatus according to claim 3, wherein:

said guide plates (49, 51) have lateral bordering units (50, 52) against internal walls of lateral limb sections (23, 24) of said support parts (TP).

5. In a suspension apparatus according to claim 4, wherein:

said connecting strip (62) is placed on a side of said corner connector (40) with said right angle through interposition of sealing strips (64, 65) with placing surfaces on external walls of said bars (22) of said support parts (TP) of said base profile sections (21) and with one flattened edge on an inclined edge of said corner connector (40);

said covering cap (60) has a plurality of side walls (61) has borings (67), and a front side of said connecting strip (62) has threaded reception mounts (63); and said side walls (61) of said covering cap (60) are attached with screws (66) to said front sides of said connection strip (62).

6. In a suspension apparatus according to claim 5, wherein:

said connecting bars (28, 29; 31, 32) are arranged in pairs, oriented to one another, and positioned on internal walls of said lateral limb sections (23, 24, 26, 27) opposite one another, of said support part (TP) and said mounting part (AP) of said base profile sections (21) is at about a same distance from said separating bar (25); and said mounting borings (46, 47) in said mounting limbs (41, 42, 44, 45) of said mounting plates of said corner connector (40) are adjusted to an arrangement of said connecting bars (28, 29; 31, 32).

7. In a suspension apparatus according to claim 6, wherein:

said corner connector (40) is at least one of a cast metal part and metallic molded injection part.

8. In a suspension apparatus according to claim 1, wherein:

said guide plates (49, 51) have lateral bordering units (50, 52) against internal walls of lateral limb sections (23, 24) of said support parts (TP).

9. In a suspension apparatus according to claim 1, wherein:

said connecting strip (62) is placed on a side of said corner connector (40) with said right angle through interposition of sealing strips (64, 65) with placing surfaces on external walls of said bars (22) of said support parts (TP) of said base profile sections (21) and with one flattened edge on an inclined edge of said corner connector (40);

said covering cap (60) has a plurality of side walls (61), each with a boring (67), and a front side of said connecting strip (62) has threaded reception mounts (63); and said side walls (61) of said covering cap (60) are attached with screws (66) to said front sides of said connection strip (62).

10. In a suspension apparatus according to claim 1, wherein:

said connecting bars (28, 29; 31, 32) are arranged in pairs, oriented to one another, and positioned on internal walls of lateral limb sections (23, 24, 26, 27) opposite one another, of said support part (TP) and said mounting part (AP) of said base profile sections (21), said pairs are positioned at about a same distance from said separating bar (25); and mounting borings (46, 47) in said mounting limbs (41, 42, 44, 45) of said mounting plates of said corner connector (40) are adjusted to an arrangement of said connecting bars (28, 29; 31, 32).

11. In a suspension apparatus according to claim 1, wherein:

said corner connector (40) is at least one of a cast metal part and metallic molded injection part.

* * * * *